United States Patent
Mori et al.

[19]

[11] Patent Number: 5,941,646
[45] Date of Patent: Aug. 24, 1999

[54] HYDRODYNAMIC TYPE POROUS OIL-IMPREGNATED BEARING AND BEARING DEVICE

[75] Inventors: Natsuhiko Mori, Mie-ken; Yasuhiro Yamamoto; Isao Komori, both of Kuwana; Kazuo Okamura, Mie-ken, all of Japan

[73] Assignee: NTN Corporation, Osaka, Japan

[21] Appl. No.: 08/979,236

[22] Filed: Nov. 26, 1997

[30] Foreign Application Priority Data

Dec. 25, 1996 [JP] Japan .................................. 8-345786
Mar. 25, 1997 [JP] Japan .................................. 9-078001

[51] Int. Cl.⁶ .............................. F16C 33/10; F16C 32/06
[52] U.S. Cl. ........................ 384/279; 384/100; 384/119; 384/902
[58] Field of Search ................... 384/279, 902, 384/100, 107, 114, 119, 121, 124

[56] References Cited

U.S. PATENT DOCUMENTS 2,800,373  7/1957  Kablick et al. ............... 384/279 X
5,678,929  10/1997  Parsoneault et al. ............ 384/112
5,746,516  5/1998  Miyasaka et al. ............... 384/292 X
5,762,423  6/1998  Mori et al. ..................... 384/279

FOREIGN PATENT DOCUMENTS

671268   4/1952  United Kingdom .
2064676  6/1981  United Kingdom .
2316453  2/1998  United Kingdom .

*Primary Examiner*—Thomas R. Hannon
*Attorney, Agent, or Firm*—Nikaido, Marmelstein, Murray & Oram LLP

[57] ABSTRACT

Two bearing bodies 1 each having a bearing surface 17 are force-fitted into a housing 7 which is opened at one end and closed at the other end thereof, and a shaft 2 (rotary shaft) is inserted in the bearing bodies 1, thereby forming two axially spaced porous oil-impregnated bearings A. The inner peripheral surfaces of the bearing bodies 1 and the oil leak preventing member 11 are formed with a plurality of inclined grooves (hydrodynamic-pressure-generating grooves 5 and air current producing grooves 12). A solid lubricating composition 3 composed of synthetic resin as a base material and oil as a lubricating component by blending lubricating oil or lubricating greases is disposed between the two bearing bodies 1.

25 Claims, 8 Drawing Sheets

SIZE OF TEST PIECE : $\phi 3 \times \phi 6 \times 5$

LEAVING CONDITION : LEAVE IN A TEMPERATURE CONTROLLED ROOM AT 20°C

OIL SEPARATION PERCENTAGE (%) = {(W1-W2)/W1} × 100

W1: WEIGHT BEFORE LEAVING

W2: WEIGHT AFTER LEAVING

HYDRODYNAMIC TYPE POROUS OIL-IMPREGNATED BEARING AND BEARING DEVICE

BACKGROUND OF THE INVENTION

The present invention relates to a hydrodynamic type porous oil-impregnated bearing and a bearing device, wherein a porous body is impregnated with lubricating oil or lubricating grease to have a self-lubricating function while floatably supporting a slide surface of a shaft by hydrodynamic oil film generated in a bearing clearance, the bearing and whose device are particularly suitable for use in a polygon mirror for laser beam printers, a spindle motor for magnetic disk drives, and the like which is required to rotate at high speed with a high degree of accuracy.

Porous oil-impregnated bearings are widely used as bearings having self-lubricability. However, since they are a kind of truly circular bearings, they tend to produce unstable vibrations when the shaft go eccentricity is small, inducing the so-called whirl in which the shaft is subjected to a revolving vibration at a rate which is half the rotary speed. As for measures against this, there may be cited as an example the formation of hydrodynazic-pressure-generating grooves, such as the herringbone or spiral type, in the bearing surface. Conventionally, hydrodynamic-pressure-generating grooves are in a porous oil-impregnated bearing to utilize the hydrodynamic pressure generated thereby to support the shaft while suppressing unstable vibrations, and examples of such arrangement are disclosed in Japanese Patent Publication No. Sho 64-11844 and Japanese Utility Model Publication No. Sho 63-19627.

Japanese Patent Publication No. Sho 64-11844 discloses a bearing device constructed by fitting a porous oil-impregnated member having herringbone grooves on a rotary shaft and combining it with a sleeve having cylindrical radial inner peripheral surface. On the other hand, Japanese Utility Model Publication No. Sho 63-19627 discloses the formation of glazed, hydrodynamic-pressure-generating grooves in the bearing surface of a porous oil-impregnated bearing.

According to Japanese Patent Publication No. Sho 64-11844, a porous oil-impregnated member having herringbone grooves is fitted on a rotary shaft with the intention of utilizing the centrifugal force attending the rotation of the shaft to cause exudation of oil into a bearing clearance. This construction, however, has the following drawbacks.

(1) The number of parts of the bearing device increases from the go usual two (rotary shaft and bearing) to three (rotary shaft, porous oil-impregnated member, and sleeve (bearing)), complicating the assembling operation and increasing the cost.

(2) In the case of a hydrodynamic bearing device, which requires a high degree of dimensional accuracy, there are as many as three parts, whose respective accuracies affect the post-assembly accuracy, so that it is more difficult to attain the intended accuracy than in the case of the two-part bearing device.

(3) During rotation, the centrifugal force continues acting on the porous oil-impregnated member. Therefore, the oil also continues exuding, so that the bearing clearance will be saturated sooner or later with oil, with continuing rotation forcing the oil to leak out of the bearing clearance. This means inevitable flow-away of oil.

According to Japanese Utility Model Publication No. Sho 63-19627, the bearing surface of a porous oil-impregnated bearing is formed with glazed, hydrodynamic-pressure-generating grooves. Such construction, however, has the following drawbacks.

(1) Since the grooves have their openings sealed, the circulation of oil, which is the greatest feature of the porous oil-impregnated bearing, is obstructed. Therefore, the oil which has been exuded in the bearing clearance is pressed into the bent regions of the grooves by the action of the herringbone grooves and stays there. A great shearing action is present in the bearing clearance, so that the oil staying in the oil grooves is subjected to this shearing force and friction heat, tending to be denatured, while a rise in temperature tends to cause premature oxidative deterioration of the oil. Therefore, the bearing life span is shortened. In contrast, in a usual porous oil-impregnated bearing, since the retained oil is circulated through the bearing clearance and bearing interior with the rotation of the shaft, it is not continuously subjected to the shearing force and since it is cooled even if once heated, there is little danger of the oil undergoing oxidative deterioration due to a rise in temperature.

(2) it is very difficult to apply a sealing treatment to the grooves. The published specification concerned states that sealing can be effected by plastic working. However, the depth of the hydrodynamic grooves is usually of the order of $\mu$m; such compression molding is not effective in sealing the openings in the surface. Further, said published specification makes mention of coating as another means of plastic working; however, the thickness of the coating film has to be less than the groove depth, which means that it is very difficult to apply a coating film which is some $\mu$m thick solely to the inclined region.

SUMMARY OF THE INVENTION

Objects of the invention are:

(1) To reduce the number of parts of the bearing to 2, while reducing the cost, making it easier to increase the degree of accuracy of the parts, and adapting them for mass production;

(2) To provide a construction such that the retained oil is circulated through the bearing clearance and the bearing interior, thereby retarding oil degradation.

(3) To find a bearing specification which allows hydrodynamic effects to be exerted irrespective of the presence of the openings in hydrodynamic-pressure-generating grooves in order to make the bearing design industrially feasible.

Figure 2:
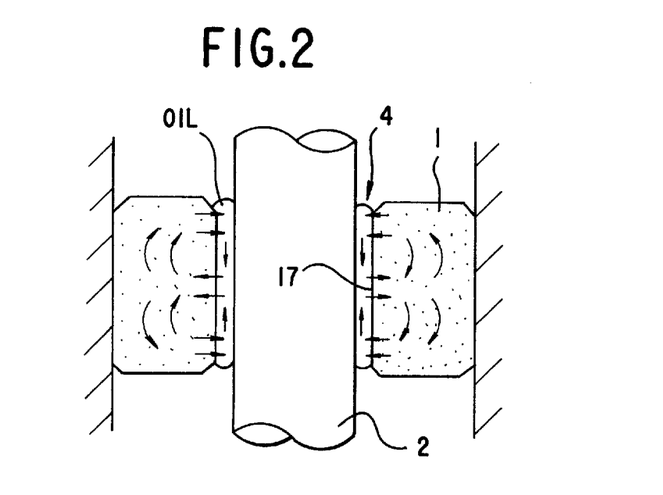
FIG. 2 is an axial sectional view showing the movement of oil in a porous oil-impregnated bearing provided with herringbone type hydrodynamic grooves.
Figure 7:
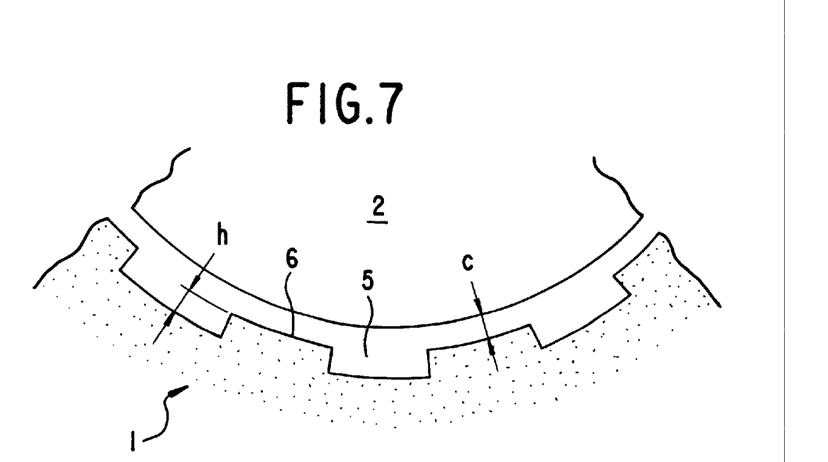
FIG. 7 is a radial sectional view of a porous oil-impregnated bearing.

When a bearing surface of a bearing body 1 is provided with hydrodynamic-pressure-generating grooves (inclined grooves of the herringbone or spiral type), the flow of oil, as seen in an axial section, is as shown, for example, in FIG. 2. The oil flows in, as indicated by arrows, from openings in the bearing surface 17 (inner surface) of the bearing body 1 into a bearing clearance 4 between the bearing surface 17 and a rotary shaft 2, to maintain an appropriate oil circulation, it is desirable that the openings be substantially uniformly distributed over the hydrodynamic-pressure-generating grooves 5 and ridges 6 between the grooves (see FIG. 7). When the proportion of the openings in the surface is decreased, the oil moves with difficulty; reversely, when it is increased, the oil moves with less difficulty. Further, the viscosity of the retained oil also has to do with the oil movement, such that the lower the viscosity, the greater the ease with which the oil moves and such that the higher the viscosity, the less the ease with which the oil moves. In addition, in this specification, the term "openings" means those portions of pores forming the porous structure of the bearing body of porous material which open to the surface.

A combination of high opening percentage and low viscosity though allowing extremely smooth movement of oil, has the trouble that since the oil exuded into the bearing clearance 4 by the action of the hydrodynamic-pressure-generating grooves 5 is easily pushed back into the interior of the bearing body, the hydrodynamic effects will be lessened to the extent not only that rotation with high accuracy can not be maintained but that the contact between the shaft 2 and the bearing body 1 causes wear of the bearing body 1 to impair the bearing functions. Reversely, a combination of low opening percentage and high viscosity makes it extremely difficult for oil to move, so that, though the generated hydrodynamic pressure is high, appropriate oil circulation is impaired and the torque is increased and hence degradation of oil is expedited by an increase in temperature of the bearing.

Therefore, opening percentage and oil viscosity have an optimum range which enables the generation of the hydrodynamic oil film necessary for floatably supporting the shaft, and appropriate circulation of oil.

Figure 3:
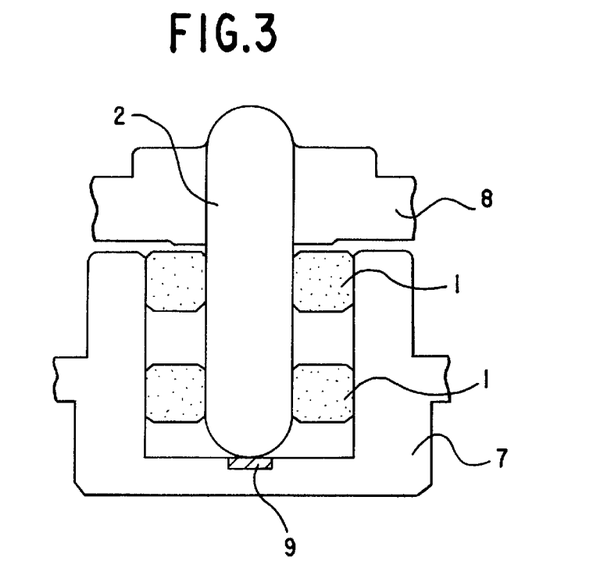
FIG. 3 is an axial sectional view showing a porous oil-impregnated bearing for evaluation test.
Figure 4:
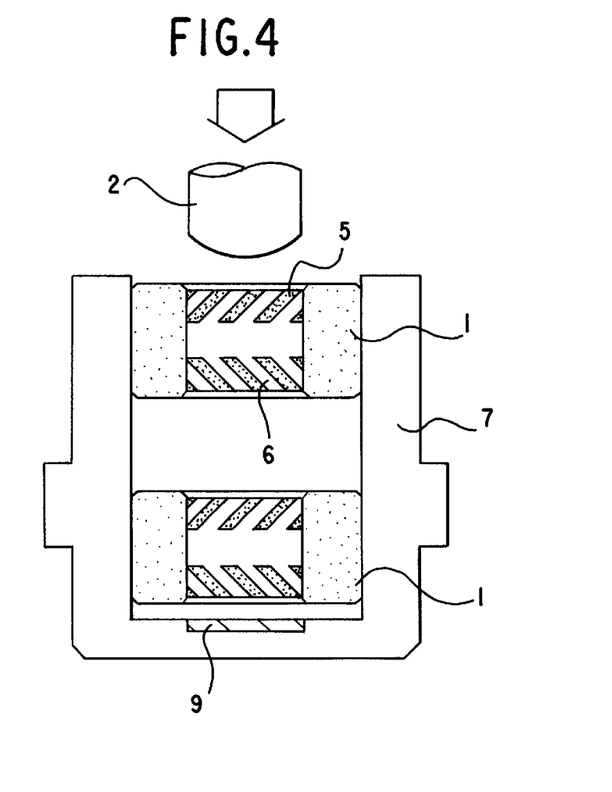
FIG. 4 is an axial sectional view showing a porous oil-impregnated bearing for evaluation test.

To clarity this optimum range, evaluation tests have been conducted using an LBP actual motor shown in FIGS. 3 and 4. In these FIGS., 7 denotes a housing, and 8 denotes a hub (rotor) fixed on the shaft 2. Further, 9 denotes a thrust support which is in contact with the front end of the shaft to support thrust load. The motor used in the evaluation tests had a shaft diameter of 4 mm and was equipped with a mirror, the rpm being 1,000, the atmosphere temperature being 40° C.

Figure 5:
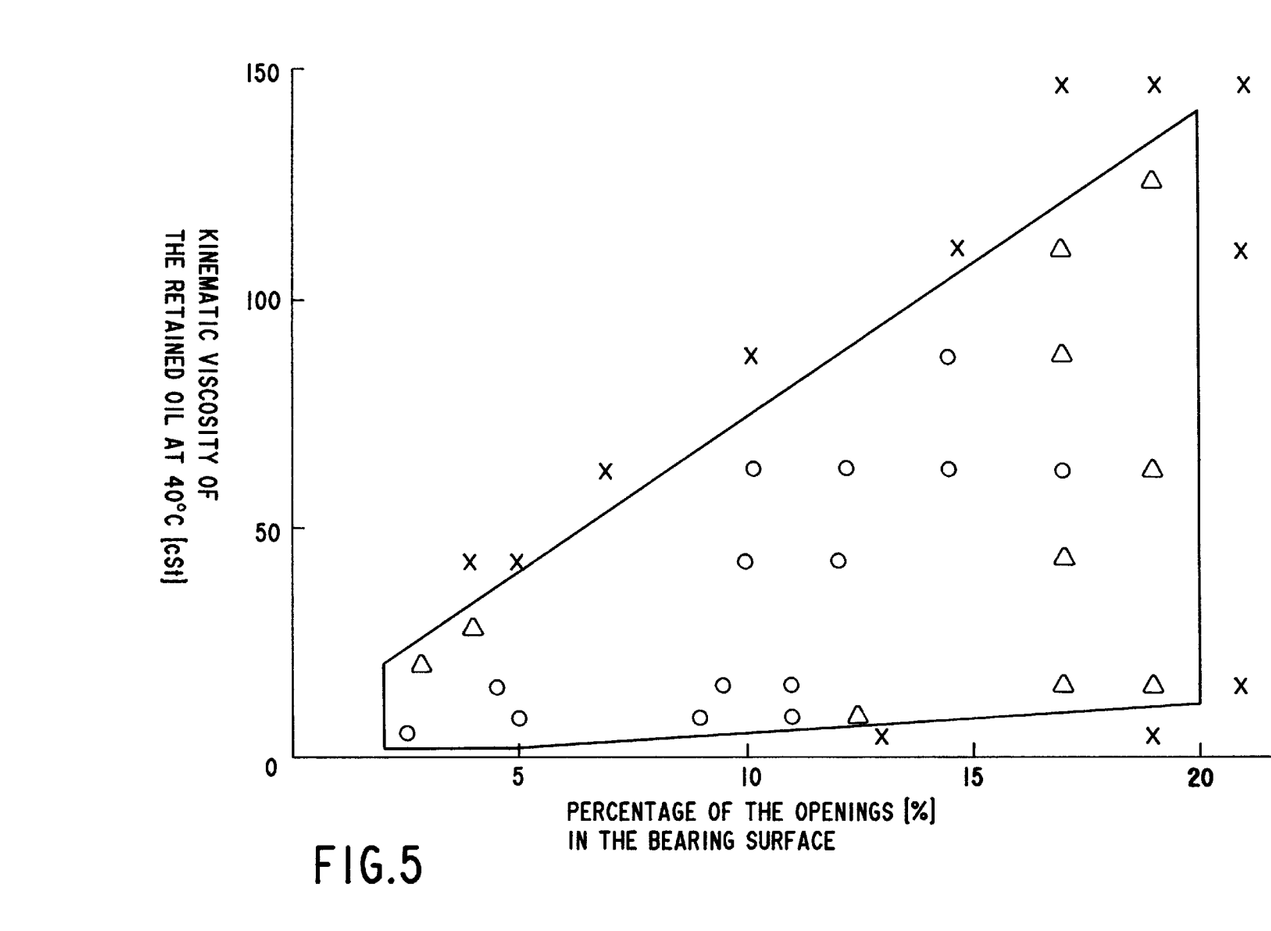
FIG. 5 is a graph showing the evaluation test results.

FIG. 5 shows the evaluation test results. In FIG. 5, the mark "○" shows that there was no trouble in 1,000-hour continuous operation in the endurance tests. The mark "Δ" shows that in a 1,000-hour operation, an interval between 500 hours and 1,000 hours was attended by troubles, such as an increase in shaft vibration (5 $\mu$m and more), increase in torque=decrease in rpm (the rpm failed to increase to 1,000) and emission of abnormal sound, thereby making normal operation impossible. The mark "X" shows that the aforesaid troubles occurred during 500 hours after the start of operation.

From the above evaluation test results, it is seen that the optimum range for opening factor and oil viscosity (where there is no mark "X" is the region surrounded by solid lines in FIG. 5, i.e., the region which satisfies the following conditions:

(1) A percentage of area of the openings in the bearing surface including the hydrodynamic-pressure-generating grooves is not less than 2% but not sore than 20%;

(2) A kinematic viscosity at 40° C. of the retained oil to be filled is 2 cSt and more;

(3) The percentage of area of the openings and the kinematic viscosity of the oil at 40° C. satisfy the relation:

$$(3/5)A-1 \leq \eta \leq (40/6)A+(20/3)$$

where A; the percentage of area of the openings (in %) $\eta$; the kinematic viscosity of the oil at 40° C. (in cSt).

Selection of values of the openings factor and the kinematic viscosity of the oil which are within such range ensures generation of a sufficient hydrodynamic oil film to floatably support the shaft and appropriate circulation of oil, thus making it possible to attain rotation with high accuracy and longer life span.

In addition, the percentage of area of the openings is preferably not less than 2% but not more than 15%.

Figure 6:
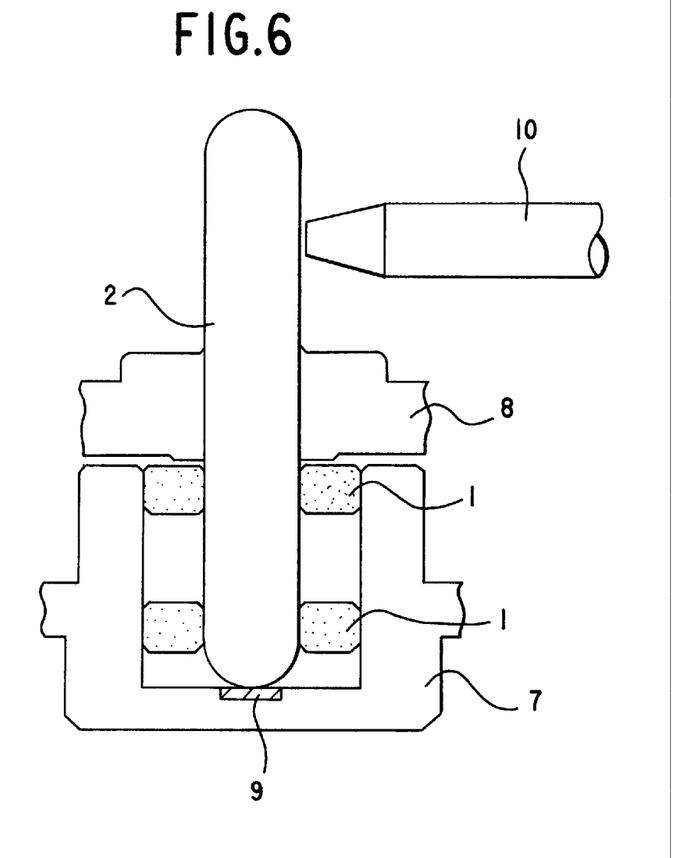
FIG. 6 is an axial sectional view showing a porous oil-impregnated bearing for evaluation test.

It is considered that in the ratio of the depth (h: see FIG. 7) of the hydrodynamic-pressure-generating grooves 5 to the bearing clearance (radial clearance: c), there is an optimum range outside which sufficient hydrodynamic effects cannot be obtained. To clarify this optimum range, evaluation tests have been conducted by replacing the shaft 2 of the LBP actual motor shown in FIG. 3 by a longer shaft, as shown in FIG. 6, to enable measurement of shaft vibration. The rpm was 10,000, and the LBP actual motor had a shaft diameter of 4 mm, not equipped with a mirror. In addition, the numeral 10 denotes a non-contact type displacement meter.

Figure 8:
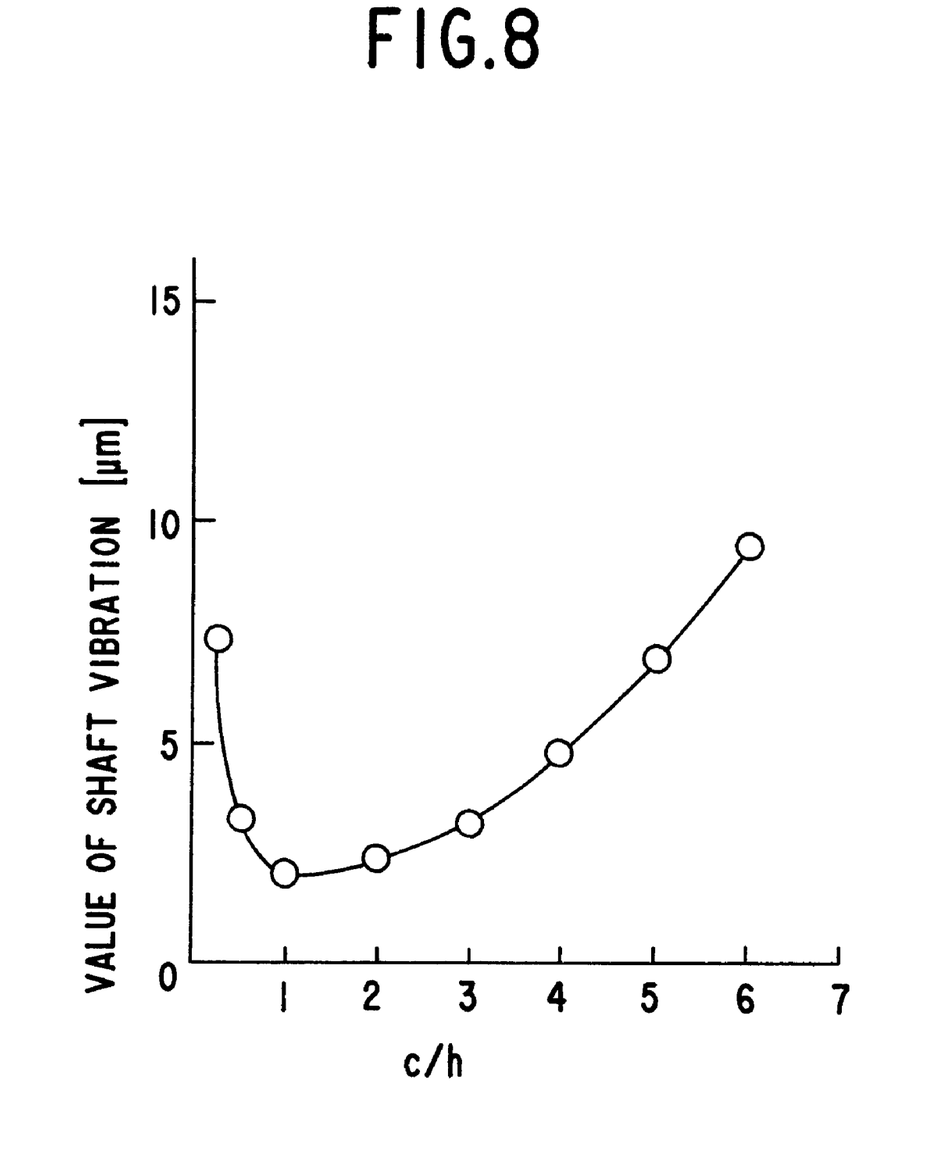
FIG. 8 is a graph showing the evaluation test results from which to find the relation between c/h and shaft vibration.

Under the above conditions, values of shaft vibration were plotted against c/h (c; radial clearance, h; groove depth), and the results shown in FIG. 8 were obtained. From FIG. 8, it is seen that when the c/h is within the range of 0.5–4.0, the shaft vibration is 5 $\mu$m or less, but when it is less than 0.5 or more than 4.0, the shaft vibration is more than 5 $\mu$m. Therefore, to maintain high accuracy it is desirable that c/h=0.5–4.0.

Figure 12:
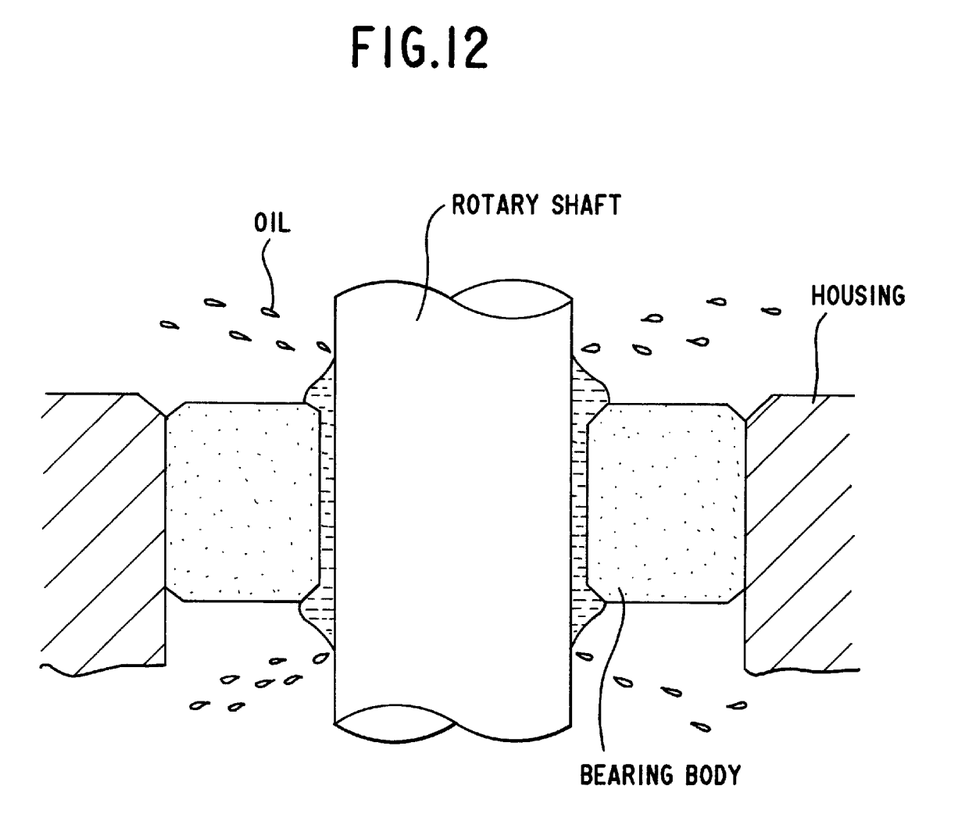
FIG. 12 is an axial sectional view showing a general porous oil-impregnated bearing.

A porous oil-impregnated bearing is used usually in self-lubrication, and it is impossible to avoid gradual consumption or outflow of oil due to spattering or evaporation of oil. In that case, the resulting reduction of the oil film generation range induces a degradation of accuracy, such as shaft vibration. Particularly, shafts are used often in their vertical position, and in the case of a laser beam printer (LBP) motor which is used at a high speed of 10,000 rpm or more, or a magnetic disk drive (HDD) motor, the oil tends to leak under the action of centrifugal force, as shown in FIG. 12, making it difficult to maintain the lubricating performance, such as oil film generation.

In the LBP and HDD, oil film exhaustion is fatal to the retention of accuracy of rotation. Particularly, in the case of a single bearing body, high speed rotation causes oil to circulate in the bearing interior while engulfing the surrounding air; thus, air sometimes enters the bearing clearance. To prevent the entry of air, an effective measure is to position a member (oil supplying member) which supplies oil as soon as even a small number of empty porosity is formed in interior of the bearing body.

Figure 1:
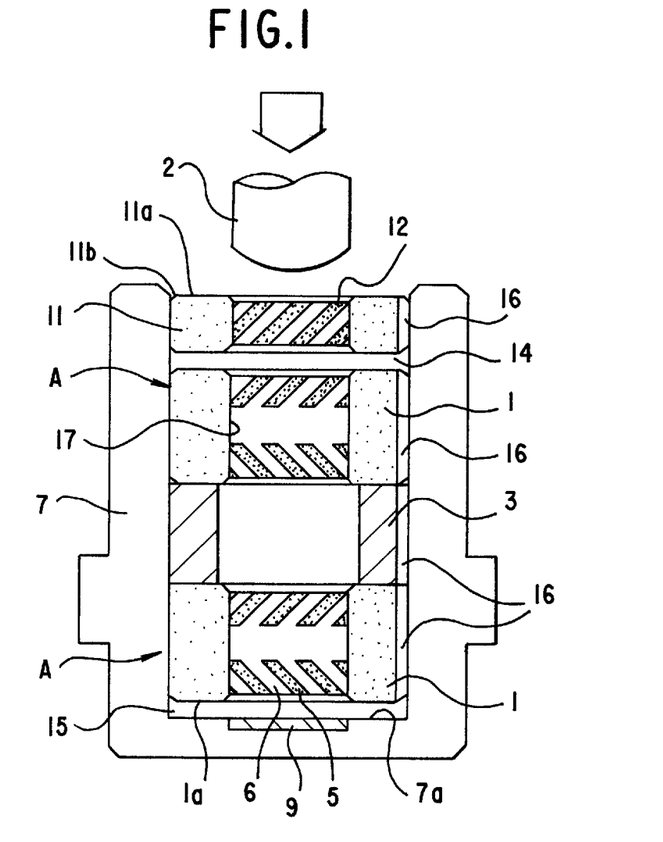
FIG. 1 is an axial sectional view showing an embodiment of the invention.

As such oil supplying member, in the present invention, a solid lubricating composition 3 is disposed in contact with the bearing body 1, as shown in FIG. 1, which composed of a synthetic resin material as a base material and oil as a lubricating component by a blending of lubricating oil or lubricating grease. The solid resin lubricating composition gradually continuously exudes the component oil therein to surface thereof at temperatures not less than at least 20° C. even in a stationary state. With such arrangement, even when the oil in the bearing body 1 flows away, fresh oil is supplied by capillary action from the resin lubricating composition 3 positioned in contact with the bearing body 1 into the interior of the bearing body 1, so that a satisfactory hydrodynamic oil film can be generated at all times between it and the rotary shaft 2.

Stated in the concrete, the solid lubricating composition 3 is produced by mixing 5–99 wt % lubricating oil which is the same as the retained oil in the bearing body or lubricating grease of which a base oil is the same as the retained oil in the bearing body, and 95–1 wt % superhigh molecular weight polyolefin powder whose average molecular weight is $1 \times 10^6 – 5 \times 10^6$, heating the mixture to fuse at or above the gelling temperature of the superhigh molecular weight polyolefin and at or below the gelling point of the lubricating grease when the lubricating grease is used, and cooling the fusion to solidify.

Figure 9:
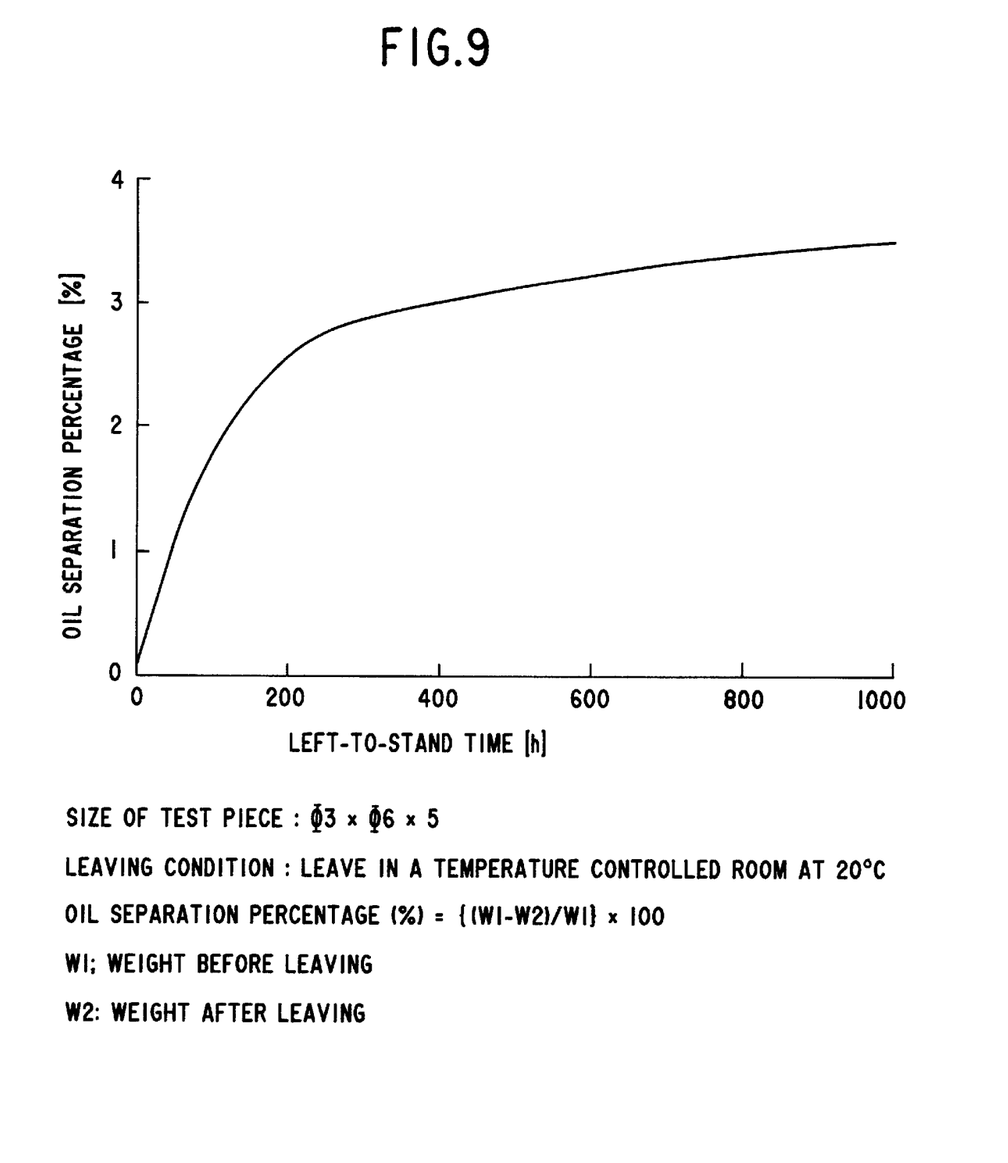
FIG. 9 is a graph showing time-dependent changes in the percentage oil separation of a solid type lubricating composition according to the invention.

Thus, the formation of the resin lubricating composition in solid form of a mixture of lubricating oil or lubricating grease and superhigh molecular weight polyolefin powder is characterized by low cost, mass productivity, easy handling and simple operation for incorporation. Further, the solid resin lubricating composition gradually continuously exudes the component oil therein, though very little by little, at temperatures above ordinary temperature (about 20° C.), so that it is capable of continuously supplying the oil to the bearing. FIG. 9 shows the results obtained by letting a solid resin lubricating composition 3 of the present invention to stand for testing, the left-to-stand time and the oil separation percentage being checked. It can be understood that the component oil is continuously separated very little by little even at an atmosphere temperature of 20° C. for 1,000 hours. The amount of separation increases with increasing atmosphere temperature.

Figure 10:
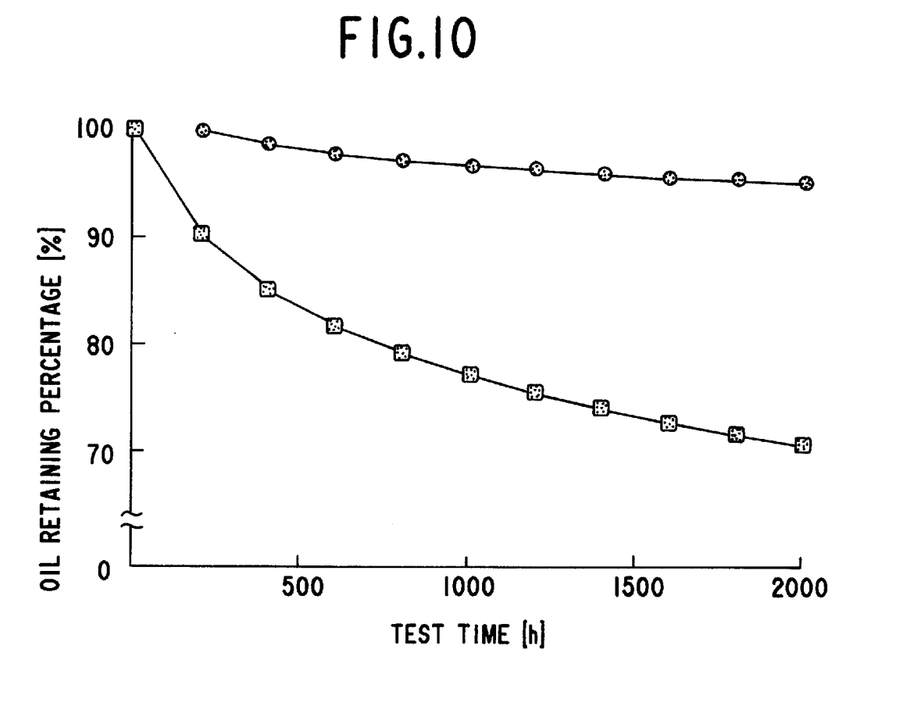
FIG. 10 is a graph showing the results of comparative tests with a solid type lubricating composition present and absent, respectively.

FIG. 10 shows a comparison between the case in which the solid resin lubricating composition is contacted with the bearing and the case of using no such oil supplying member. It is seen that in the case of the absence of an oil supplying member (indicated by the mark ■), about 30% of the initially retained oil flows away in about 2,000 hours of operation, while in the case of presence (indicated by the mark •) even when the retained oil flows away from the bearing body, the oil is supplied to the bearing, so that the loss can be held down to only about 5%.

If it is used under conditions of high temperature atmosphere, high speed rotation or generation of much heat by friction, there are times when too much oil is exuded from the solid resin lubricating composition, so that it is desirable to blend one or more of the materials, solid wax, low molecular weight polyethylene and polyamide resin in an amount of 1–50 wt % as an oil exudation suppressing agent for the resin lubricating composition.

As shown in FIG. 1, a cylindrical oil leak preventing member 11 having an inner diameter equal to or slightly larger than that of the bearing body 1 (porous oil-impregnated bearing A) is disposed on one of or each of the axial sides of the bearing body 1. The inner peripheral surface of the oil leak preventing member 11 may be formed with air current producing grooves 12 which, during relative rotation between it and the shaft, produce air currents in the clearance between it and the shaft 2 which are directed to the bearing body. The air current producing grooves 12 may be a plurality of inclined grooves. In the illustrated example, two bearing bodies 1 are vertically spaced, with the oil leak preventing member 11 disposed outside the upper bearing body 1. However, such oil leak preventing member 11 nay also be disposed inside said bearing body 1. Further, the oil leak preventing member 11 nay be provided on one of or each of the sides of the lower bearing body 1.

Figure 11:
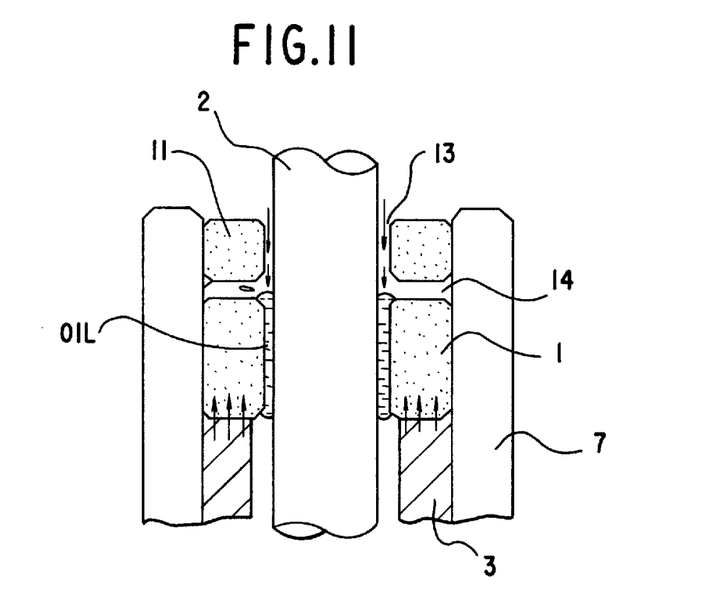
FIG. 11 is an axial sectional view showing the movement of oil in a porous oil-impregnated bearing provided with an oil leak preventing member.

With this arrangement, as shown in FIG. 11, with the rotation of the shaft 2, air currents are generated in the clearance 13 between the shaft 2 and the inner peripheral surface of the oil leak preventing member 12 and directed toward the bearing body 1 (downward as seen in the figure), so that, even when the retained oil flows out of the bearing, it cannot pass through the clearance 13 between the shaft 2 and the oil leak preventing member 11. Oil leak is prevented by this action. Further, when the shaft is stationary, the capillary force in said clearance 13 holds oil; therefore, there is no possibility of oil leaking out when the rotation stops.

In this case, it is preferable that the oil leak preventing member 11 be a porous body and that a space 14 be defined between it and the adjoining bearing body 1. With this arrangement, it is possible for the oil leak preventing member 11, which is made of porous body, to absorb the leaking oil. Further, when the shaft is at rest, oil between the oil leak preventing member 11 and the shaft 3 can be absorbed, so that the portion exposed to the air is reduced and hence the evaporation of oil and the generation of dust can be reduced. The oil absorbed by the oil leak preventing member 11 is withdrawn into the clearance 13 with rotation and sent back to the bearing body 1 through the space 14 by the air currents produced by the action of the air current producing grooves 12.

As shown in FIG. 1, when an end surface 11a and a chamfer 11b of the oil leak preventing member 11 opposite to the bearing body 1 are glazed to effect sealing to the extent that a percentage of area of openings is 5% or less, preferably to the extent of perfect sealing, then the evaporation of oil absorbed by the oil leak preventing member 11 and the generation of dust can be further reduced.

As shown in FIG. 1, bearing bodies 1 are press-fitted into a cylindrical housing 7 which is opened at one end and closed at the other end thereof, and the solid resin lubricating composition 3 is received therein in contact with the bearing bodies 1. The oil leak preventing member 11 is positioned outside the bearing body 1 to close the opening of the housing 7. In this case, since the hydrodynamic action is generated by the bearing and the oil is supplied from the resin lubricating composition 3 at all times, as described above, generation of a satisfactory hydrodynamic oil film can be maintained at all times and so can be a high accuracy of rotation for a long time. Further, the oil leak from the bearing is compensated by the oil leak preventing member 11, there being no outflow of oil.

A space 15 is defined between the bottom surface 7 of the housing 7 and the innerside end surface 1a of the bearing body 1 opposed thereto, and an air current passage 16 is provided so as to ensure that the space 15 and the outside of the housing communicate with each other at places other than the bearing clearance 4, the air current passage 16 serving as an air bleeder. This arrangement makes it easier to insert the shaft 2 in the assembling operation. Further, during rotation, the internal pressure would increase due to generation of heat, pushing up the shaft (rotor) to make rotation unstable. Such situation, however, can also be prevented.

When a rotary member, for example, a rotor 8, is attached to the rotary shaft 2, and the end surface of the bearing body 1 opposed to the rotor is formed with herringbone or spiral hydrodynamic-pressure-generating grooves so as to utilize the hydrodynamic pressure generated by the hydrodynamic-pressure-generating grooves during rotation of the shaft 2 to support the thrust load, then not only the radial load but also the thrust load can be supported, so that the thrust support 9 can be dispensed with.

In this case, a percentage of area of the openings in the end surface of the bearing body 1 provided with hydrodynamic-pressure-generating grooves is preferably not less than 2% but not sore than 20%.

As is clear from the above description, according to the present invention, the following effects are obtained:

(1) Environmental pollution due to flow-away, spattering and evaporation of oil can be reduced to a great extent;

(2) Unstable vibrations, such as whirl, can be suppressed, minimizing the shaft vibration to achieve high accuracy of rotation;

(3) At all times, generation of satisfactory oil films can be maintained;

(4) It is possible to improve durability to a great extent;

(5) The oil supplying member, which is solid, is easy to handle and is high in productivity.

DESCRIPTION OF THE PREFERRED EMBODIMENTS

An embodiment of the invention will now be described.

FIG. 1 shows an example of a hydrodynamic type porous oil-impregnated bearing device according to the invention. Two bearing bodies 1 each having a bearing surface 17 are force-fitted into a housing 7 which is opened at one end and closed at the other end thereof, and a shaft 2 (rotary shaft) is inserted in the bearing bodies 1, thereby forming two axially spaced porous oil-impregnated bearings A.

A solid lubricating composition 3 composed of synthetic resin as a base material and oil as a lubricating component by blending lubricating oil or lubricating grease is disposed between the two bearing bodies 1, with au oil leak preventing member 11 disposed above the bearing body 1 on the open side (the upper side) to close the upper end opening in the housing 7. The upper end surface 11a and upper chamfer 11b of the oil leak preventing member 11 have undergone a sealing treatment. Further, a space 15 is defined between the end surface 1a of the bearing body 1 on the closed side (lower side) and the bottom surface 7a of the housing 7, and an air current passage 16 is formed to provide communication between this space 15 and the outside. This air current passage 16 is formed by providing an axial notch in each of the outer surfaces of the bearing bodies 1, the resin lubricating composition 3 and the oil leak preventing member 11. The inner peripheral surfaces of the bearing bodies 1 and the oil leak preventing member 11 are formed with a plurality of inclined grooves (hydrodynamic-pressure-generating grooves 5 and air current producing grooves 12). The oil leak preventing member 11 is made of porous body, not retaining lubricating oil or the like. There is no restriction on the materials of the bearing bodies 1 and the oil leak preventing member 11, and a known porous body having air voids can be formed by sintering or foam-processing powder metal, iron, cast iron, copper, synthetic resin or ceramic material, however, the bearing bodies 1 and the oil leak preventing member 11 are preferable to be made of sintered alloy whose main material is iron or copper.

As shown in FIG. 1, by forming herringbone type hydrodynamic grooves 5 in the bearing surfaces 17 of the bearing bodies 1, hydrodynamic oil films are generated in the bearing clearances 4 during relative rotation between them and the rotary-shaft 2, thereby making it possible to effectively suppress unstable vibrations, such as whirl. In addition, in the bearing surfaces 17 (also the bearing surface shown in FIG. 4), the groove regions 5 (filled in with black) are inclined directed in mutually opposite directions toward axially opposite sides and annular ridges 6 (white regions) are formed between the mutually oppositely inclined groove regions 5 (in the same figure, the annular ridges are positioned axially centrally of the bearing surface). The width c of the bearing clearance 4, when the radius of the shaft 2 is R, is desirably $c/R = 1/2000 - 1/400$.

When the groove depth is represented by h, it is preferable that $c/h = 0.5 - 4.0$, and more preferably $c/h = 0.5 - 3.0$.

Further, a percentage of area of the openings in the bearing surface of the bearing body 1, in terms of the surface area ratio, is desirably 2–20%. If it is less than 2%, circulation of oil is obstructed, while if it is more than 20%, hydrodynamic effects cannot be generated and hence a satisfactory oil film is not generated. The oil viscosity is selected according to the percentage of area of the opening.

The oil supplying member 3 disposed in contact with the bearing bodies 1 is a porous body of metal or resin or may be a known one, such as a fiber material, e.g., felt, impregnated with oil. It is preferable to use a resin lubricating composition which is solid and which gradually continuously exudes the component oil to surface thereof at temperatures of 20° C. and above. The resin lubricating composition can be produced by a very simple method. For example, it is obtained by uniformly mixing a predetermined amount of lubricating grease or lubricating oil with a predetermined amount of superhigh molecular weight polyolefin powder, pouring the mixture into a die of predetermined shape, heating the mixture to fuse at or above the gelling temperature of the superhigh molecular weight polyolefin and less than the dropping point of lubricating grease when such grease is used, and cooling the mixture at ordinary temperature to solidify. The superhigh molecular weight polyolefin powder used in the invention is a powder of polyethylene, polypropylene, polybutene or a copolymer thereof, or a mixture of these powders, the molecular weight of each powder being so selected that the average molecular weight measured by the viscosity method is $1 \times 10^6 - 5 \times 10^6$. Polyolefins which are within the range of such average molecular weight are superior to low molecular weight polyolefins in rigidity and oil retention and will hardly flow even heated to high temperatures. The proportion of such superhigh molecular weight polyolefin in the lubricating composition should be 95–1 wt %. In addition, the amount depends on the degree of oil separation, toughness and hardness required of the composition. The greater the amount of superhigh molecular weight polyolefin, the higher the hardness of the gel after dispersion at a predetermined temperature.

Further, the lubricating grease used in the invention is not particularly restricted, and may be a soap-thickened or non-soap-thickened lubricating greases examples of such lubricating grease being lithium soap-diester type, lithium soap-mineral oil type, sodium soap-mineral oil type, aluminum soap-mineral oil type, lithium soap-diester mineral oil type, non-soap-diester type, non-soap-mineral oil type, non-soap-polyolester type, and lithium soap-polyolester type. The lubricating oil is not particularly restricted, either, examples thereof being diester type, mineral oil type, diester mineral oil type, and polyolester type. In addition, the base oil of the lubricating grease or the lubricating oil is desirably the same as the initially retained oil in the bearing bodies 1, but it may be more or less different therefrom so long as the lubricating characteristics are not impaired.

Although the melting points of the superhigh molecular weight polyolefins mentioned above are not constant as they vary according to their respective average molecular weights, one having an average molecular weight of $2 \times 10^6$ as measured by the viscosity method has a melting point of 136° C. As for a commercially available one having the same average molecular weight, there is Mipelon (registered trade mark) XM-220, produced by Mitsui Petrochemical Industries, Ltd., and the like.

Therefore, when it is desired to disperse lubricating grease or lubricating oil in a matrix of superhigh molecular weight polyolefin to retain it therein, the materials, after being mixed, are heated to a temperature above the gelling temperature of the superhigh molecular weight polyolefin and when lubricating grease is used, to a temperature less than the dropping point thereof, e.g., to 150–200° C.

Such bearing device can be widely utilized, for example, in various motors, including laser beam printer polygon mirror motors, and magnetic disk drive spindle motors, and motors for axial fans, ventilating fans, electric fans and other electric appliances, electric parts for cars, etc. while greatly improving their durability without polluting the surrounding environment with oil. That is, even when the oil originally retained in the porous oil-impregnated bearing flows away, it will not flow outside because of the presence of the oil leak preventing member 11. Further, since the oil is supplied to the bearing from the solid resin lubricating composition 3, the oil film in the bearing clearance is maintained at all times, so that high accuracy of rotation can be maintained at all times by the hydrodynamic effects of the hydrodynamic-pressure-generating grooves 5 formed in the bearing surfaces of the bearing bodies 1. Further, friction due to oil exhaustion can be prevented to greatly increase the durability life. This solid resin lubricating composition, unlike felt, does not contain fibrous materials, so that there is no trouble of fibrous dust entering the bearing clearance. Further, since the composition, unlike grease, is solid, there is no possibility of it getting wrapped around the rotating shaft, thus forming no cause of variation of rotation. And since it is solid, it is very easy to handle and can be efficiently incorporated during assembling operation.

Further, since the bearing is not of the construction which uses a ferrofluidic seal for sealing purposes, it is only necessary that the oil leak preventing member 11, bearing bodies 1, the oil supplying member (the solid resin lubricating composition 3) be fixed in position as by being press-fitted in the housing 7; thus, the assembling efficiency is high and the cost is low.

What is claimed is:

1. A hydrodynamic porous oil-impregnated bearing comprising: a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves, wherein the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings and $\eta$ is the kinematic viscosity of the retained oil at 40° C. (cSt).

2. A hydrodynamic porous oil-impregnated bearing as set forth in claim 1, wherein a ratio of a groove depth (h) of the hydrodynamic-pressure-generating grooves to the bearing clearance (c) is within the range:

c/h=0.5–4.0.

3. A hydrodynamic porous oil-impregnated bearing comprising:

a hydrodynamic porous oil-impregnated bearing comprising a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves, wherein the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings (%) and $\eta$ is the kinematic viscosity of the retained oil at 40° C. (cSt);

a solid resin lubricating composition composed of a synthetic resin material as a base material and oil as a lubricating component by blending of lubricating oil or lubricating grease, the solid resin lubricating composition gradually continuously exuding the component oil to surface thereof at temperatures not less than at least 20° C. even in a stationary state;

said bearing and said solid resin lubricating composition being contact with each other via contact surfaces thereof, the component oil in the solid resin lubricating composition gradually continuously exuding to the contact surface to supply to the interior of the bearing body.

4. A hydrodynamic porous oil-impregnated bearing as set forth in claim 3, wherein a ratio of a groove depth (h) of the hydrodynamic-pressure-generating grooves to the bearing clearance (c) is within the range:

c/h=0.5–4.0.

5. A hydrodynamic porous oil-impregnated bearing device as set forth in claim 3, wherein said solid lubricating composition is produced by mixing 5–99 wt % lubricating oil which is the same as the retained oil in the bearing body or lubricating grease of which a base oil is the same as the retained oil in the bearing body, and 95–1 wt % superhigh molecular weight polyolefin powder whose average molecular weight is $1\times10^6$–$5\times10^6$, heating the mixture to fuse at or above the gelling temperature of the superhigh molecular weight polyolefin and at or below the gelling point of the lubricating grease when the lubricating grease is used, and cooling the fusion to solidify.

6. A hydrodynamic porous oil-impregnated bearing device as set forth in claim 5, wherein said solid lubricating composition is further blended one or more materials as an oil exudation suppressing agent selected from the class consisting of solid wax, low molecular weight polyethylene, and polyamide resin in an amount of 1–50 wt %.

7. A hydrodynamic porous oil-impregnated bearing device comprising:

a hydrodynamic porous oil-impregnated bearing comprising a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves;

a cylindrical oil leak preventing member disposed on one of or each of the axial sides of said bearing, the oil leak preventing member having an inner diameter equal to or slightly larger than that of the bearing body, an inner surface of the oil leak preventing member being formed with air current generating grooves which, during relative rotation between it and the shaft, generates air currents in a clearance between it and the shaft flowing toward the bearing body.

8. A hydrodynamic porous oil-impregnated bearing device as set forth in claim 7, wherein at least one of the two factors, a percentage of area of the openings in the bearing surface including the hydrodynamic-pressure-generating grooves and kinematic viscosity of the retained oil is set within a range which is capable of securing the generation of the hydrodynamic oil film and the circulation of the retained oil.

9. A hydrodynamic porous oil-impregnated bearing as set forth in claim 7, wherein the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings (%) and η is the kinematic viscosity of the retained oil at 40° C. (cSt).

10. A hydrodynamic porous oil-impregnated bearing as set forth in claim 7, wherein a ratio of a groove depth (h) of the hydrodynamic-pressure-generating grooves to the bearing clearance (c) is within the range:

c/h=0.5–4.0.

11. A hydrodynamic porous oil-impregnated bearing device comprising:

a hydrodynamic porous oil-impregnated bearing comprising a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves;

a solid resin lubricating composition composed of a synthetic resin material as a base material and oil as a lubricating component by blending of lubricating oil or lubricating grease, the solid resin lubricating composition gradually continuously exuding the component oil to surface thereof at temperatures not less than at least 20° C. even in a stationary state;

said bearing and said solid resin lubricating composition being contact with each other via contact surfaces thereof, the component oil in the solid resin lubricating composition gradually continuously exuding to the contact surface to supply to the interior of the bearing body;

a cylindrical oil leak preventing member disposed on one of or each of the axial sides of said bearing, the oil leak preventing member having an inner diameter equal to or slightly larger than that of the bearing body, an inner surface of the oil leak preventing member being formed with air current generating grooves which, during relative rotation between it and the shaft, generates air currents in a clearance between it and the shaft flowing toward the bearing body.

12. A hydrodynamic porous oil-impregnated bearing device as set forth in claim 11, wherein at least one of the two factors, a percentage of area of the openings in the bearing surface including the hydrodynamic-pressure-generating grooves and kinematic viscosity of the retained oil is set within a range which is capable of securing the generation of the hydrodynamic oil film and the circulation of the retained oil.

13. A hydrodynamic porous oil-impregnated bearing as set forth in claim 11, wherein;

the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings (%) and η is the kinematic viscosity of the retained oil at 40° C. (cSt).

14. A hydrodynamic porous oil-impregnated bearing as set forth in claim 11, wherein a ratio of a groove depth (h) of the hydrodynamic-pressure-generating grooves to the bearing clearance (c) is within the range:

c/h=0.5–4.0.

15. A hydrodynamic porous oil-impregnated bearing device as set forth in claim 11, wherein said solid lubricating composition is produced by mixing 5–99 wt % lubricating oil which is the same as the retained oil in the bearing body or lubricating grease of which a base oil is the same as the retained oil in the bearing body, and 95–1 wt % superhigh molecular weight polyolefin powder whose average molecular weight is $1 \times 10^6$–$5 \times 10^6$, heating the mixture to fuse at or above the gelling temperature of the superhigh molecular weight polyolefin and at or below the gelling point of the lubricating grease when the lubricating grease is used, and cooling the fusion to solidify.

16. A hydrodynamic porous oil-impregnated bearing device as set forth in claim 11, wherein said solid lubricating composition is further blended one or more materials as an oil exudation suppressing agent selected from the class consisting of solid wax, low molecular weight polyethylene, and polyamide resin in an amount of 1–50 wt %.

17. A hydrodynamic porous oil-impregnated bearing device as set forth in claim 11, wherein the bearing body is fixed in a cylindrical housing which is opened at one end and closed at the other end thereof, the solid lubricating composition is received in the housing such that it is in contact with the bearing body, and the oil leak preventing member is disposed outside the bearing body to close the opening of the housing.

18. A hydrodynamic porous oil-impregnated bearing device as set forth in claim 17, wherein a space is defined between a bottom surface of the housing and an innerside end surface of the bearing body opposed thereto, and an air current passage is provided so as to ensure that the space and the outside of the housing communicate with each other at places other than the bearing clearance.

19. A hydrodynamic porous oil-impregnated bearing device as set forth in claim 7 or 11, wherein the oil leak preventing member is made of porous material, and a space is defined between it and the bearing body.

20. A hydrodynamic porous oil-impregnated bearing device as set forth in claim 18, wherein an end surface and a chamfer of the oil leak preventing member opposite to the bearing body are glazed to effect sealing such that a percentage of area of openings in the end surface and the chamfer is 5% or less.

21. A hydrodynamic porous oil-impregnated bearing comprising:

a hydrodynamic porous oil-impregnated bearing comprising a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves, wherein the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings (%) and η is the kinematic viscosity of the retained oil at 40° C. (cSt);

a rotary member attached to the shaft;

an end surface of the bearing body opposed to the rotary member being provided with hydrodynamic-pressure-generating grooves, and thrust load of the shaft being supported by hydrodynamic pressure generated by the hydrodynamic-pressure-generating grooves in the end surface during rotation of the shaft.

22. A hydrodynamic porous oil-impregnated bearing as set forth in claim 21, wherein a ratio of a groove depth (h) of the hydrodynamic-pressure-generating grooves to the bearing clearance (c) is within the range:

c/h=0.5–4.0.

23. A hydrodynamic porous oil-impregnated bearing comprising:

a hydrodynamic porous oil-impregnated bearing comprising a bearing body made of porous material and having a bearing surface opposed through a bearing clearance to a slide surface of a shaft to be supported thereby, oil retained into the bearing body by impregnation of lubricating oil or lubricating grease, and inclined hydrodynamic-pressure-generating grooves formed in the bearing surface of the bearing body, said bearing floatably supporting the slide surface of the shaft by hydrodynamic oil film generated in the bearing clearance, while making the retained oil circulate between an interior of the bearing body and the bearing clearance through openings in the bearing surface including the hydrodynamic-pressure-generating grooves, wherein the openings are substantially uniformly distributed over the bearing surface including the hydrodynamic-pressure-generating grooves, the percentage of area of the openings is not less than 2% but not more than 20%, the kinematic viscosity of the retained oil at 40° C. is 2 cSt or more, and the percentage of area and the kinematic viscosity satisfy the following relation:

$$(3/5)A-1 \leq \eta \leq (40/6)A+(20/3)$$

where A is the percentage of area of the openings (%) and η is the kinematic viscosity of the retained oil at 40° C. (cSt);

a solid resin lubricating composition composed of a synthetic resin material as a base material and oil as a lubricating component by blending of lubricating oil or lubricating grease, the solid resin lubricating composition gradually continuously exuding the component oil to surface thereof at temperatures not less than at least 20° C. even in a stationary state;

said bearing and said solid resin lubricating composition being contact with each other via contact surfaces thereof, the component oil in the solid resin lubricating composition gradually continuously exuding to the contact surface to supply to the interior of the bearing body;

a rotary member attached to the shaft;

an end surface of the bearing body opposed to the rotary member being provided with hydrodynamic-pressure-generating grooves, and thrust load of the shaft being supported by hydrodynamic pressure generated by the hydrodynamic-pressure-generating grooves in the end surface during rotation of the shaft.

24. A hydrodynamic porous oil-impregnated bearing as set forth in claim 23, wherein a ratio of a groove depth (h) of the hydrodynamic-pressure-generating grooves to the bearing clearance (c) is within the range:

c/h=0.5–4.0.

25. A hydrodynamic porous oil-impregnated bearing as set forth in claim 21 or 23, wherein a percentage of area of the openings in the end surface of the bearing body formed with the said hydrodynamic-pressure-generating grooves is not less than 2% but not more than 20%.

* * * * *

UNITED STATES PATENT AND TRADEMARK OFFICE
CERTIFICATE OF CORRECTION

PATENT NO. : 5,941,646
DATED : August 24, 1999
INVENTOR(S) : Mori et al.

It is certified that error appears in the above-identified patent and that said Letters Patent is hereby corrected as shown below:

On the title page:

Please delete item [30], " Mar. 25, 1997 [JP] Japan ......... 9-078001, and insert -- Mar. 28, 1997 [JP] Japan ......... 9-078001 --

Signed and Sealed this

Twenty-first Day of March, 2000

Attest:

Attesting Officer

Q. TODD DICKINSON

Commissioner of Patents and Trademarks